(12) United States Patent
Yoshino et al.

(10) Patent No.: US 7,438,497 B2
(45) Date of Patent: Oct. 21, 2008

(54) PLASTIC COMPONENT HAVING BREAKAWAY FEATURE

(75) Inventors: Masahiro Yoshino, Aichi (JP); Thomas A. Volpone, Cortland, OH (US); Daniel J. Erdman, West Middlesex, PA (US)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 11/717,461

(22) Filed: Mar. 13, 2007

(65) Prior Publication Data

US 2008/0226386 A1 Sep. 18, 2008

(51) Int. Cl.
*F16D 1/00* (2006.01)
(52) U.S. Cl. .................. 403/408.1; 403/344; 403/361; 108/56.3; 108/180; 439/475; 425/DIG. 109
(58) Field of Classification Search ............. 403/311, 403/312, 344, 361, 408.1; 439/475, 573; 249/52; 425/DIG. 109; 211/182, 183; 438/131, 438/137; 108/56.3, 180
See application file for complete search history.

(56) References Cited

U.S. PATENT DOCUMENTS

| | | | | |
|---|---|---|---|---|
| 3,965,529 A | * | 6/1976 | Hadzimahalis | 16/441 |
| 5,249,983 A | * | 10/1993 | Hirai | 439/573 |
| 5,442,152 A | * | 8/1995 | Huang | 200/345 |
| 5,593,318 A | * | 1/1997 | Bilson et al. | 439/573 |
| 6,375,499 B1 | * | 4/2002 | Lin | 439/573 |
| 6,969,815 B1 | * | 11/2005 | Lu | 200/345 |
| 7,033,662 B2 | * | 4/2006 | Togawa et al. | 428/99 |

* cited by examiner

*Primary Examiner*—Daniel P. Stodola
*Assistant Examiner*—Nahid Amiri
(74) *Attorney, Agent, or Firm*—David P. Wood

(57) ABSTRACT

A plastic component is attached to a mounting structure by a fastener that extends at least into a mounting hole in the plastic component. The mounting hole is located near an edge corner of a cantilevered mounting tab that forms part of the plastic component. The mounting tab comprises a generally flat plate that has a depending flange that extends around a rounded corner near which the mounting hole is located and a depending sleeve that is contiguous with the mounting hole. The mounting tab has a break away portion so that the plastic component can be removed for recycling easily. Three variations of the breakaway portion are disclosed.

8 Claims, 2 Drawing Sheets

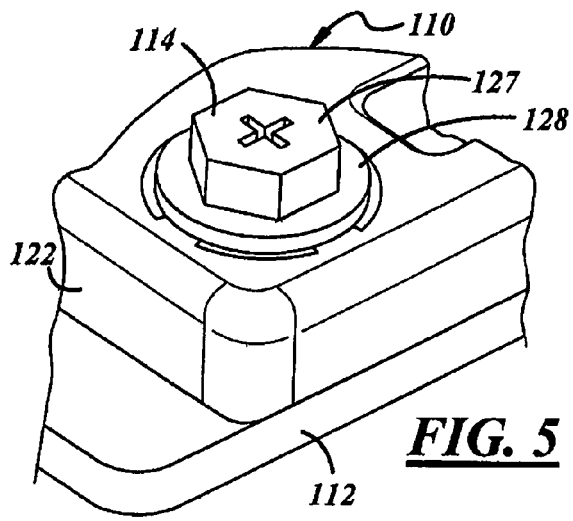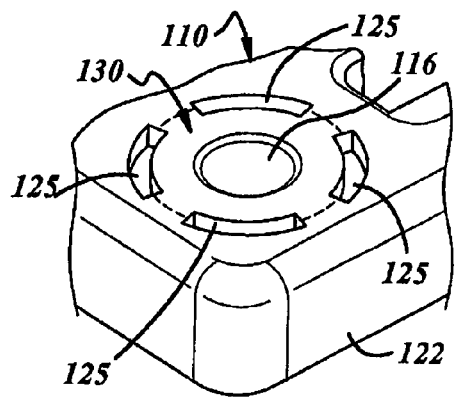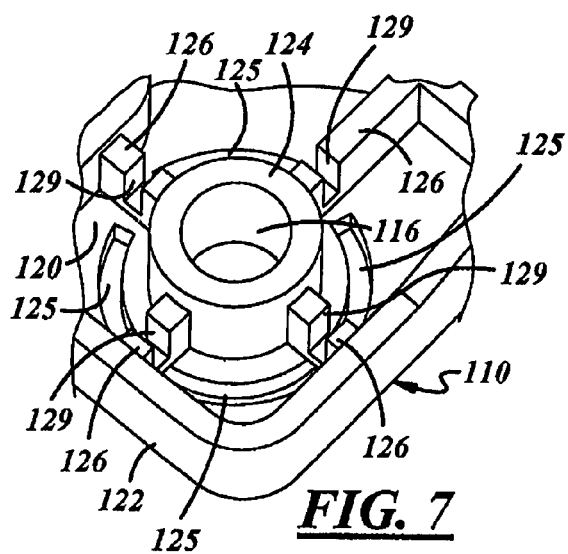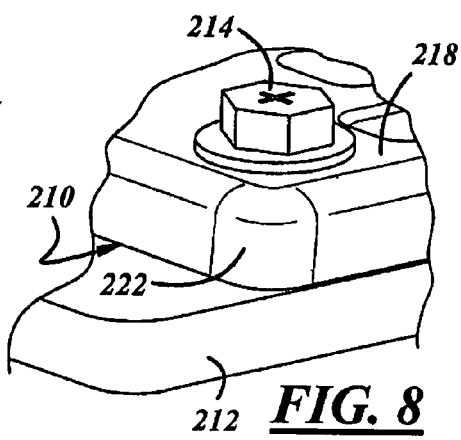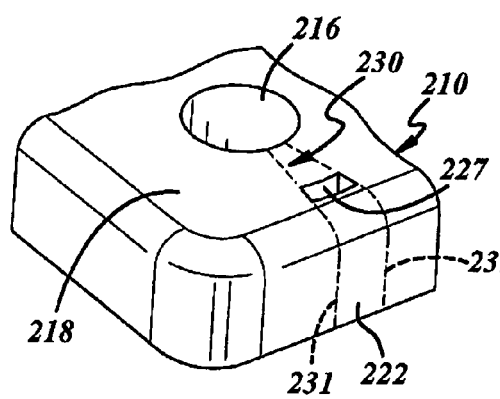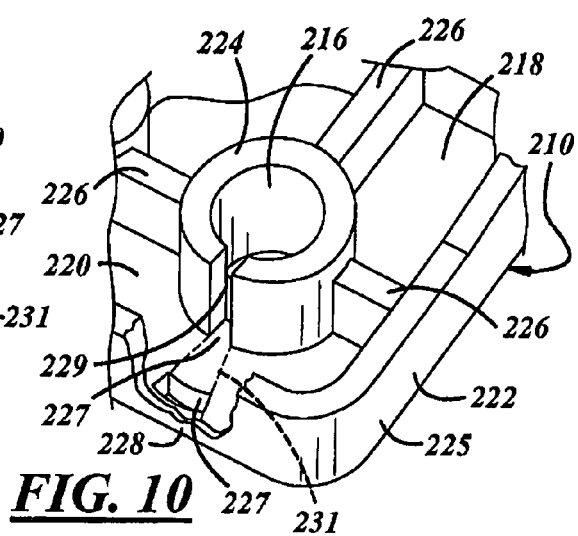

PLASTIC COMPONENT HAVING BREAKAWAY FEATURE

BACKGROUND OF THE INVENTION

This invention relates generally to a plastic component that is mounted on a rigid mounting structure, such as a recyclable plastic wiring channel, electrical connector holder, electrical center or the like that is mounted on a metal automobile body panel with a fastener.

Because of environmental concerns, recycling of manufactured assemblies, such as an automobile is advantageous. Recycling often requires dismantling of manufactured assemblies comprising components of different materials that are fastened to one another but that are not compatible from a recycling standpoint, for instance, plastic parts that are fastened to rigid metal structures. Consequently these components must be separated for recycling efficiency. The separation of such components can be tedious and costly. For instance, a plastic component that is fastened to an automobile body by a bolt or the like must be separated by removing the bolt or fastener which may not be easily accessible.

SUMMARY OF THE INVENTION

The plastic component of this invention has a breakaway feature so that the plastic component when it is fastened to a rigid support structure can be removed from the support structure easily.

In its preferred form, the plastic component of this invention has a breakaway feature so that the plastic component when it is fastener to a rigid support structure can be removed from the support structure without removing the fastener.

BRIEF DESCRIPTION OF THE DRAWINGS

FIG. 5 is an enlarged fragmentary view of an assembly that includes a second embodiment of a plastic component having a breakaway feature in accordance with the invention;

FIG. 6 is an enlarged fragmentary top perspective view of the plastic component shown in FIG. 5;

FIG. 7 is an enlarged fragmentary bottom perspective view of the plastic component shown in FIG. 5;

FIG. 8 is an enlarged fragmentary view of an assembly that includes a third embodiment of a plastic component having a breakaway feature in accordance with the invention;

FIG. 9 is an enlarged fragmentary top perspective view of the plastic component shown in FIG. 8; and FIG. 10 is an enlarged fragmentary bottom perspective view of the plastic component shown in FIG. 8.

DETAILED DESCRIPTION OF THE PREFERRED EMBODIMENTS

Referring now to FIGS. 1, 2, 3 and 4, a plastic component 10, such as an electrical wire channel, an electrical connector holder, or an electrical center, is attached to a mounting structure 12 by a fastener 14 that extends through a mounting hole 16 in the plastic component 10. Fastener 14 is illustrated as a threaded bolt or machine screw that screws into a threaded hole in the mounting structure 12. However any suitable fastener that extends into or through mounting hole 16 may be used.

Figure 3:
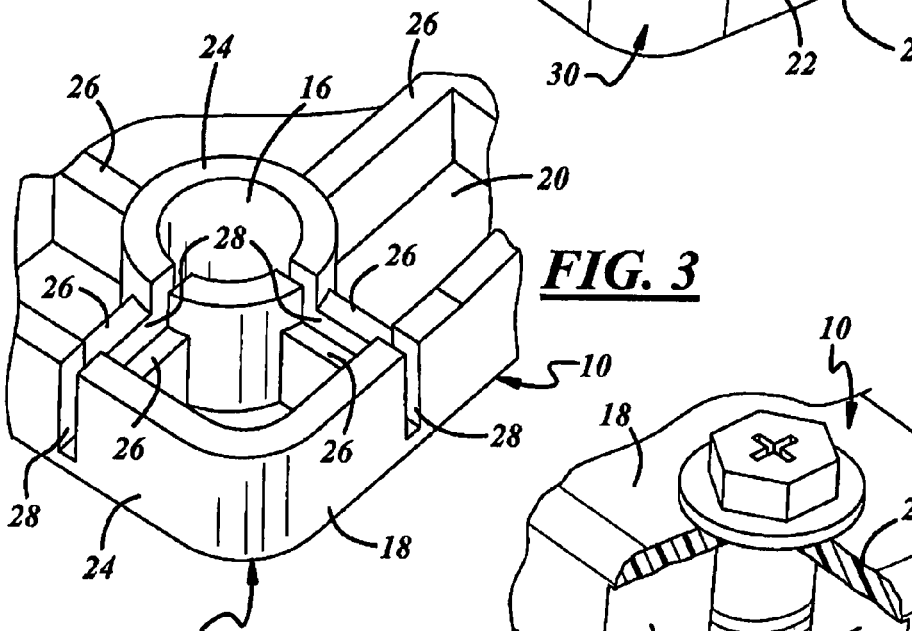
FIG. 3 is an enlarged fragmentary bottom perspective view of the plastic component shown in FIG. 1.
Figure 4:
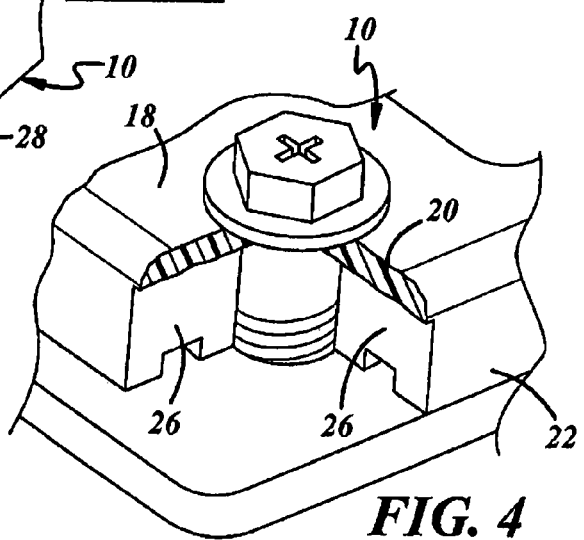
FIG. 4 is an enlarged fragmentary top perspective view of the assembly of FIG. 1 showing the plastic component with a portion broken away.

The mounting hole 16 is located near an edge or rounded corner of a cantilevered mounting tab 18 that forms part of the plastic component 10. Mounting tab 18 comprises a generally flat plate 20. Plate 20 has that a depending flange 22 that extends around the rounded corner near which the mounting hole 16 is located as best shown in FIGS. 3 and 4. Plate 20 also has a depending sleeve 24 that is contiguous with the mounting hole 16 and that is reinforced by depending gussets 26 that are arranged in a cruciform. Two of the gussets 26 attach the depending sleeve 24 to the respective side walls of depending flange 22. Two slits 28 extend through the flange 22, the depending sleeve 24 and the two gussets 26 respectively as best shown in FIG. 5. The slits 28 define a breakaway portion indicated generally at 30 in FIGS. 1, 2 and 3. As seen in these figures, breakaway portion 30 extends from mounting hole 16 and to the edge defined by the side walls of flange 22. The slits 28 may extend into the bottom of the plate 20 but preferably do not extend through the plate 20 so that the top of the mounting tab 18 has a smooth pleasing unslotted appearance as best shown in FIG. 2.

Figure 1:
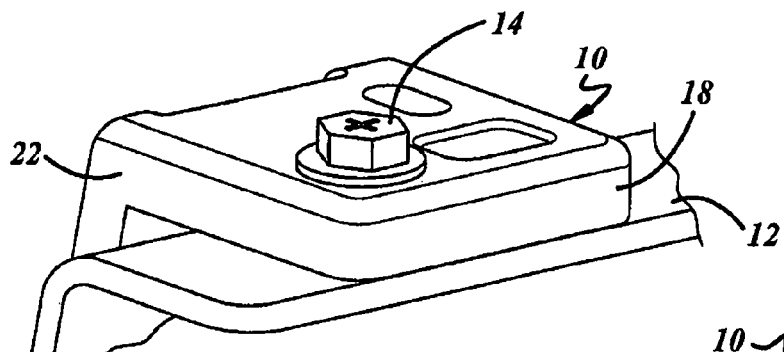
FIG. 1 is a perspective view of an assembly that includes a plastic component having a breakaway feature in accordance with the invention.
Figure 2:
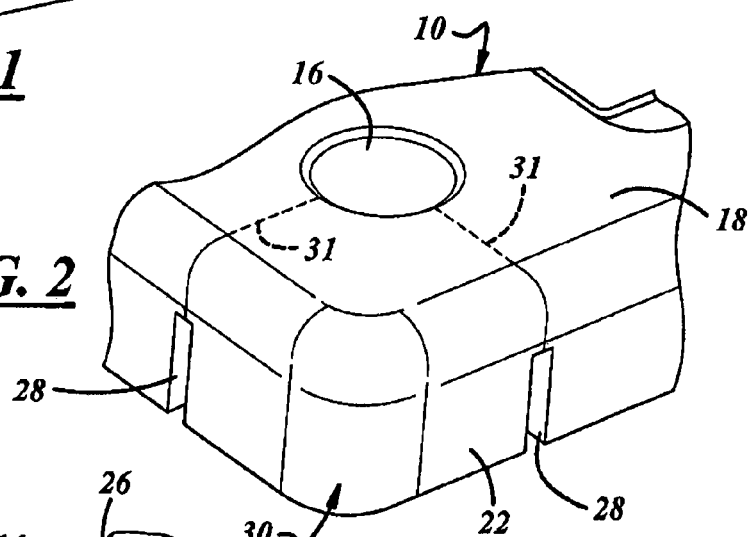
FIG. 2 is an enlarged fragmentary top perspective view of the plastic component shown in FIG. 1.

The plastic component 10 is easily removed for recycling simply by breaking away the corner breakaway portion 30 along the imaginary dashed break lines 31 shown in FIG. 2 and exposing the shank of the fastener 14 as shown in FIG. 4. The mounting tab 18 may then simply be pulled away from the exposed shank of the fastener 14. Thus the entire plastic component 10 may be removed easily for recycling without any need for removing the fastener 14.

Referring now to FIGS. 5, 6 and 7, a second embodiment of a plastic component 110, such as an electrical wire channel, an electrical connector holder, or an electrical center, is attached to a mounting structure 112 by a fastener 114 that extends through a mounting hole 116 in the plastic component 110. Fastener 114 is also illustrated as a threaded bolt or machine screw that screws into a threaded hole in the mounting structure. However as stated above, any suitable fastener that extends into or through hole 116 may be used.

The mounting hole 116 is located near an edge or rounded corner of a cantilevered mounting tab 118 that forms part of the plastic component 110. Mounting tab 118 comprises a generally flat plate 120. Plate 120 has that a depending flange 122 that extends around the rounded corner near which the mounting hole 116 is located as best shown in FIGS. 6 and 7. Plate 120 also has a depending sleeve 124 that is contiguous with the mounting hole 116 and that is reinforced by a plurality of depending gussets 126 that are arranged in cruciform. Two of the gussets 126 attach the depending sleeve 124 to the respective side walls of flange 122. Plate 120 has a plurality of arcuate slots 125 that extend through it. Slots 125 are concentric with the mounting hole 116 as shown in FIGS. 6 and 7. Slots 125 are preferably spaced from mounting hole 116 radially so that the slots 125 are located outwardly of the head 127 of fastener 114 including any separate or integral washer 128 that is a functional part of the head as shown in FIG. 5. Slits 129 extend through the gussets 126 in a concentric arrangement with the arcuate slots 125 as best shown in FIG. 7. The slits 129 may extend into the bottom of the plate 120 but do not extend through the plate 120 as best shown in FIG. 6. The slots 125 and slits 129 define a breakaway portion that is defined in part by arcuate slots 125 and indicated generally at 130 in FIGS. 5, 6 and 7.

The plastic component 110 is easily removed for recycling simply by breaking away the annular breakaway portion 130 along the imaginary dashed break lines 131 shown in FIG. 6 leaving only sleeve 124 and a small portion of mounting tab 118 attached to mounting structure 112. Thus most of the plastic component 110 may be removed for recycling without any need for removing the fastener 114.

Referring now to FIGS. 8, 9 and 10, a third embodiment of a plastic component 210, such as an electrical wire channel, an electrical connector holder, or an electrical center, is attached to a mounting structure 212 by a fastener 214 that extends through a mounting hole 216 in the plastic component 210. Fastener 214 is also illustrated as a threaded bolt or machine screw that screws into a threaded hole in the mounting structure. However any suitable fastener that extends into or through mounting hole 216 may be used.

The mounting hole 216 is located near an edge of a cantilevered mounting tab 218 that forms part of the plastic component 210. Mounting tab 218 comprises a generally flat plate 220. Plate 220 has a depending flange 222 that extends around a rounded corner that includes the edge near which the mounting hole 216 is located as best shown in FIGS. 9 and 10. Plate 220 also has a depending sleeve 224 that is contiguous with the mounting hole 216 and that is reinforced by a plurality of depending gussets 226, one of which attaches the depending sleeve 224 to one corner side wall 225 of depending flange 222. A slot 227 extends through plate 220 between sleeve 224 and the other corner side wall 228 of depending flange 222. Slit 229 extends through the sleeve 224 in alignment with slot 227 as best shown in FIG. 10. The slot 227 and slit 229 define a wedge like breakaway portion indicated generally at 230 in FIGS. 8 and 9. The slit 229 may extend into the bottom of plate 220 but preferably does not extend through the plate 220 as best shown in FIG. 9.

The plastic component 210 is easily removed for recycling simply by breaking away the wedge like breakaway portion 230 along the imaginary dashed break lines 231 shown in FIGS. 9 and 10 and exposing the shank of the fastener 214. The mounting tab 218 is then simply pulled away from the exposed shank of the fastener 214. Thus the entire plastic component 210 may be removed for recycling without any need for removing the fastener 214.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A plastic component adapted for attachment to a mounting structure by a fastener that extends at least into a mounting hole in the plastic component, the mounting hole being located near an edge of a cantilevered mounting tab that forms part of the plastic component, the mounting tab comprising generally flat plate that has a depending flange at the edge near which the mounting hole is located, the plate having a depending sleeve that is contiguous with the mounting hole and that is spaced radially from the depending flange and that is reinforced by at least one depending gusset that is attached to the depending sleeve and to the depending flange and wherein the slit defines a breakaway portion, which extends from the mounting hole and to an edge defined by side walls of the flange, wherein the depending sleeve has a slit that extends through the gusset and the depending flange.

2. The plastic component as defined in claim 1 wherein the gusset is attached to a first side wall of the flange, wherein the depending sleeve is reinforced by a second gusset that attaches the depending sleeve to the depending flange, and wherein the depending sleeve has a second slit that extends through the depending sleeve, the second gusset and the depending flange.

3. The plastic component as defined in claim 1 wherein the depending sleeve is reinforced by a plurality of gussets, at least two of which attach the depending sleeve to the depending flange.

4. A plastic component adapted for attachment to a mounting structure by a fastener that extends at least into a mounting hole in the plastic component, the mounting hole being located near an edge of a cantilevered mounting tab that forms part of the plastic component, the mounting tab comprising generally flat plate that has a depending flange at the edge near which the mounting hole is located, the plate having a depending sleeve that is contiguous with the mounting hole and that is reinforced by at least one depending gusset that is attached to the depending sleeve, wherein the depending sleeve is reinforced by a plurality of gussets, at least two of which attach the depending sleeve to the depending flange, wherein the generally flat plate has a plurality of arcuate slots that extend through the generally flat plate, the arcuate slots being located outwardly and concentric with the depending sleeve, and wherein the gussets have slits that extend through the gussets in a concentric arrangement with the arcuate slots, and wherein the slots and slits define an annular breakaway portion.

5. The plastic component as defined in claim 1 wherein the generally flat plate has a slot that extends through the generally flat plate between the depending flange and the slit of the depending sleeve.

6. A plastic component of one piece construction adapted for attachment to a mounting structure by a fastener that extends at least into a mounting hole in the plastic component, the mounting hole being located near a rounded corner of a cantilevered mounting tab that forms part of the plastic component, the mounting tab comprising generally flat plate that has a depending flange that extends around the rounded corner near which the mounting hole is located, the plate having a depending sleeve that is contiguous with the mounting hole, that is radially spaced from the depending flange, and that is reinforced by a plurality of gussets, at least two of which attach the depending sleeve to the depending flange, and the depending sleeve having two slits that extend through the depending sleeve, the at least two gussets respectively and the depending flange to define a corner breakaway portion of the plastic component.

7. The plastic component as defined in claim 6 wherein the slits do not extend through the generally flat plate so that the top of the mounting tab has a smooth, pleasing unslotted appearance.

8. The plastic component as defined in claim 7 wherein the plurality of depending gussets are arranged in cruciform.

* * * * *